US006817958B2

United States Patent
Kaido et al.

(10) Patent No.: US 6,817,958 B2
(45) Date of Patent: Nov. 16, 2004

(54) TENSIONER WITH PROJECTION-PREVENTING HOOK

(75) Inventors: Tomokazu Kaido, Osaka (JP); Tadashi Shintani, Osaka (JP); Masaki Miyaji, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 66 days.

(21) Appl. No.: 10/198,272

(22) Filed: Jul. 17, 2002

(65) Prior Publication Data

US 2003/0017893 A1 Jan. 23, 2003

(30) Foreign Application Priority Data

Jul. 23, 2001 (JP) ........................................ 2001-221933

(51) Int. Cl.[7] ............................................... F16H 7/08
(52) U.S. Cl. ...................................... 474/101; 403/120
(58) Field of Search ................................ 474/101, 109, 474/111; 403/120, 321, 322.1, 322.4, 323, 330; 242/103, 204; 49/394, 449

(56) References Cited

U.S. PATENT DOCUMENTS

| | | | | | |
|---|---|---|---|---|---|
| 952,277 | A | * | 3/1910 | Pilarski | ..................... 292/204 |
| 5,030,169 | A | * | 7/1991 | Kiso et al. | ................... 474/110 |
| 5,346,436 | A | * | 9/1994 | Hunter et al. | ................ 474/110 |
| 5,601,505 | A | * | 2/1997 | Tada | ........................... 474/110 |
| 5,700,215 | A | * | 12/1997 | Tada et al. | ................... 474/110 |
| 6,116,660 | A | * | 9/2000 | Langkamp et al. | ........... 292/65 |
| 6,527,308 | B2 | * | 3/2003 | Linares | ....................... 292/103 |

FOREIGN PATENT DOCUMENTS

| JP | 58-38189 | | 8/1983 | |
|---|---|---|---|---|
| JP | 6-193696 | * | 7/1994 | ................. 474/138 |

* cited by examiner

*Primary Examiner*—David A. Bucci
*Assistant Examiner*—Vicky A. Johnson
(74) *Attorney, Agent, or Firm*—Howson and Howson

(57) ABSTRACT

A tensioner, for a timing chain, belt or the like in an internal combustion engine, has a projection-preventing hook that secures a spring-urged plunger in a withdrawn condition prior to installation of the tensioner, but releases the plunger during operation so that the plunger can exert a force on a pivoted chain- or belt-engaging tensioner lever. A resisting member is provided on a fulcrum pin on which the hook is pivoted, in order to exert a frictional force on the hook, thereby preventing the hook from unexpectedly returning to its plunger latching condition and preventing vibration noise to movements of the hook. The tensioner can be mounted without regard to its direction, and therefore a threaded mounting can be used, simplifying mounting and demounting of the tensioner.

2 Claims, 5 Drawing Sheets

TENSIONER WITH PROJECTION-PREVENTING HOOK

BACKGROUND OF THE INVENTION

This invention relates to a tensioner used for applying tension to a timing belt, a timing chain or the like for a vehicle engine. The invention relates more specifically to a tensioner with a projection-preventing hook for its plunger.

Tensioner have been used widely to maintain proper tension, and to prevent vibration, in timing belts and timing chains that connect the crankshaft of an internal combustion engine to its camshaft or camshafts. In a typical engine timing chain or belt, a tensioner lever is pivotally supported on the engine body (see Japanese utility model publication No. Sho 58-38189). The lever is maintained in sliding contact with the slack side of the timing belt or chain in order to apply tension to the chain. A tensioner exerts a force on a back surface of the lever by means of a plunger projecting from a tensioner housing.

FIG. 7 shows a conventional tensioner 20 mounted on an engine block 30. The tensioner 20 has a housing 22, and a plunger 21 spring-urged in the projecting direction and having a head portion 21a. A lock pin 23 is provided on a side wall of the plunger 21 adjacent the front end of the plunger, and a fulcrum pin 24 is provided on a side wall of the housing. A projection-preventing hook 25, which can move into locking engagement with the lock pin 23 when the plunger is withdrawn, is pivotally supported on the fulcrum pin 24.

The projection-preventing hook holds the plunger 21 in a withdrawn position when the tensioner 20 is being handled prior to mounting on the engine block 30.

As shown in FIG. 7, the tensioner is mounted so that the notch of hook 25 faces upward. An inclined portion 25a of the hook 25 is engaged by the lock pin 23. After the tensioner is mounted on the engine block 30, when the plunger 21 is moved slightly in the withdrawing direction, by a force exerted on its head portion 21a, inclined portion 25a serves as a cam. The force exerted on inclined portion 25a by the lock pin 23 causes the hook 25 to rotate on the fulcrum pin 24, whereupon the hook disengages from the lock pin 23 and hangs by its own weight. With the lock pin 23 thus disengaged the plunger is released, and the tensioner 20 can function in the normal manner.

Since the projection-preventing hook 25 is pivoted on the fulcrum pin 24, it is possible for the hook 25 to return to a locking condition due to continuous slight vibrations during operation of the engine. It is also possible for the projection-preventing hook 25, which is freely pivoted on the fulcrum pin, to swing like a pendulum due to continuous vibration of the engine, and to generate additional vibration noises. Moreover, the vibration may loosen the mounting of the hook 25, allowing it to fall off the fulcrum pin 24, causing a breakdown in the engine.

The projection-preventing hook 25 may be mounted on the engine block 30 with its notch facing downward, i.e., in a direction opposite to the usual mounting direction shown in FIG. 7. The condition in which the notch faces downward is illustrated in FIG. 8, in which a tensioner is shown mounted on an engine block 30 by threads, and its rotation is stopped when a flange 27 engages the engine block. In the case depicted in FIG. 8, where the notch of the projection-preventing hook 25 faces downward, the operation of the hook is as depicted in FIGS. 9(a) and 9(b). When the plunger 21 is moved slightly in the withdrawing direction by an external force F applied to the end of the plunger, the projection-preventing hook 25 is raised as shown in FIG. 9(a), and the locking relationship between the projection-preventing hook 25 and the lock pin 23 is temporarily released. However, the projection-preventing hook 25 may return to locking engagement with the lock pin 23, as shown in FIG. 9(b), by pivoting under its own weight, or as a result of engine vibration. Thus, there was a problem that the projection-preventing hook 25 and the lock pin 23 could not be disengaged irreversibly, and the conventional tensioner would not function reliably.

Although a thread-mounted tensioner such as shown in FIG. 8 can be mounted and demounted easily during engine assembly and maintenance, the direction in which the notch of its projection-preventing hook faces cannot be predetermined easily. Accordingly, although the thread-mounted tensioner has significant advantages, demand for thread mounted tensioners has been low.

SUMMARY OF THE INVENTION

A general object of the invention is to provide a tensioner having a projection-preventing hook, that can reliably function as a tensioner irrespective of the position in which the tensioner is mounted on an engine block. Another object of the invention is to prevent vibration noise due to the projection-preventing hook.

The tensioner in accordance with the invention comprises a tensioner housing having front and rear ends. A plunger extends outward from the interior of the housing at the front end thereof, and has a forward end outside the housing. The plunger is slidable into and out of the housing along an axis from a withdrawn position to an projected position, and is spring-urged in a projecting direction along the axis. A lock pin, provided on the plunger adjacent the forward end of the plunger, extends laterally with respect to the axis. A fulcrum pin is provided on a side wall of the tensioner, and a projection-preventing hook is pivoted on the fulcrum pin. The fulcrum pin is positioned so that the hook can engage the lock pin when the plunger is in its withdrawn position. A resisting member, fitted onto the fulcrum pin, exerts a frictional force on the hook to produce resistance to pivoting movement of the hook.

In one preferred embodiment of the invention, the resisting member is an O-shaped ring. In another preferred embodiment, the resisting member is a plate-shaped spring. The invention is particularly advantageous where the tensioner is mounted by mounting threads provided on a portion of the housing adjacent the rear end thereof, so that the rotational position of the housing, and the orientation of the hook, are not predeterminable.

A first advantage of the invention is that, regardless of position at which the tensioner is mounted on an engine block, regardless of the direction of the pivot axis, and regardless of whether the hook is oriented with its opening facing upward, downward, or in an intermediate direction between the upward and downward directions, pivoting movement of the projection-preventing hook can be suppressed. Therefore, even if the projection-preventing hook is oriented so that its own weight would tend to move it to a latching position where it would engage the lock pin on the plunger, and even though it is subject to continuous slight vibration during operation of the engine, it does not return unexpectedly to its latching position. Thus, the tensioner of the invention is more reliable than conventional tensioners having projection-preventing hooks. Furthermore, when the projection-preventing hook is engaged with the lock pin, the tensioner of the invention reliably retains the plunger in its withdrawn position unless a manual disengaging force is applied to the projection-preventing hook.

Since the resisting member absorbs continuous slight vibrations during operation of the engine, which would otherwise be transmitted to the projection-preventing hook, vibration noise, which would otherwise be generated by vibration of the hook, is suppressed.

Where the resisting member is an O-shaped ring, sliding friction acts between the ring and the projection-preventing hook. Thus, pivoting of unlocked projection-preventing hook is suppressed, the locking pin is released reliably, and the released condition is reliably maintained.

Where the resisting member is a plate-shaped spring, the resisting member exerts pressure on the projection-preventing hook, positively preventing pivoting of the projection-preventing hook even during continuous slight vibrations caused by operation of the engine. Moreover, the projection-preventing hook reliably releases the lock pin, and the released condition is maintained reliably.

When the tensioner is provided with threads for engagement with a housing on an engine block or the like, and rotation of the tensioner is stopped by engagement of a flange on the tensioner with a part of the housing, the rotational position of the tensioner cannot be predetermined reliably. However, because the resisting member acts to resist rotation of the hook about its pivot, the hook operates properly regardless of the rotational position of the tensioner.

BRIEF DESCRIPTION OF THE DRAWINGS

Preferred embodiments of the invention will now be described in detail, by way of example only, with reference to the accompanying drawings, in which.

DETAILED DESCRIPTION OF THE PREFERRED EMBODIMENT

Preferred embodiments of a tensioner according to the invention will now be described with reference to drawings.

Figure 1:
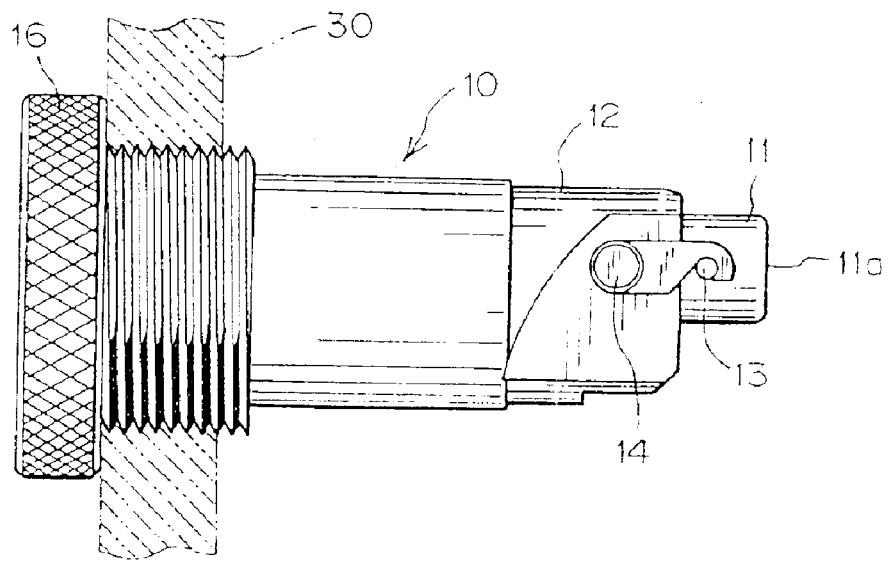
FIG. 1 is side elevational view of a tensioner in accordance with a first embodiment of the invention.
Figure 2:
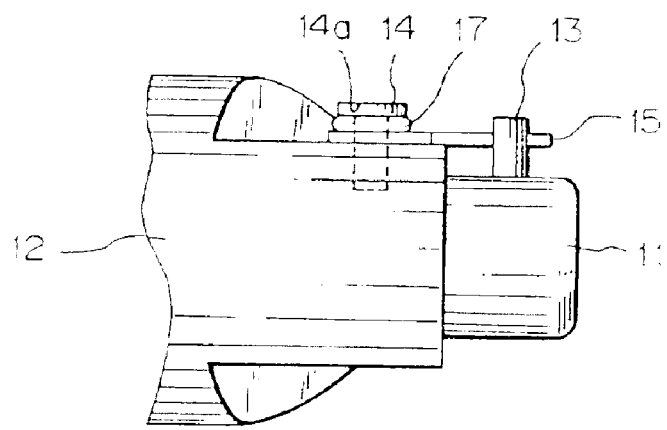
FIG. 2 is an enlarged view of a portion of the tensioner of FIG. 1.
Figure 3:
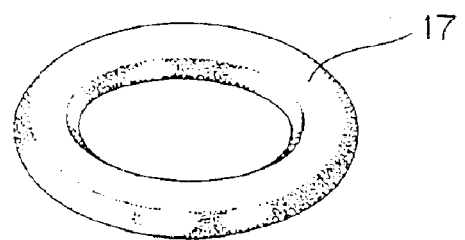
FIG. 3 is an enlarged perspective view of an O-shaped ring used in the first embodiment.

In the embodiment shown in FIGS. 1–3, a tensioner 10 includes a plunger 11 in a cylinder bored in a housing 12 inward in an axial direction. The plunger has a projecting head portion 11a. A lock pin 13 is provided on sidewall portion adjacent the front end of the plunger 11, and a fulcrum pin 14 is provided on a sidewall portion of the housing 12. A projection-preventing hook 15, which can be engaged in locking relationship with the lock pin 13 when the plunger is in its withdrawn condition, is pivotally supported on the fulcrum pin 14.

Although not shown, a coil spring, for urging the plunger 11 axially in the projecting direction, is provided inside the housing 12 between an end wall of the bore of the housing and the inner end of the plunger.

As shown in FIG. 2, a resisting member, consisting of an O-shaped ring 17 (FIG. 3), is disposed between a flat, dish-shaped, head portion 14a of the fulcrum pin 14 and the projection-preventing hook 15. Alternatively, the O-shaped ring 17 may be positioned on the fulcrum pin between the projection-preventing hook 15 and the side wall of the housing 12.

The O-shaped ring 17 is an elastic member composed of a synthetic resin or the like having suitable frictional properties for resisting rotation of the hook 15 about the fulcrum pin 14.

In the tensioner of FIGS. 1–3, free pivoting of the projection-preventing hook 15 is prevented by the O-shaped ring 17. Thus, when the lock pin 13 is released by rotation of the hook 15 as a result of an initial inward movement of plunger 11, return of the hook to the locking position is prevented by the friction between the hook 15 and the O-shaped ring 17. Thus, the tensioner 10 can be mounted without regard to its rotational position, and a mounting structure consisting of threads and a flange can be used.

The O-shaped ring 17 can prevent the projection-preventing hook 15 from unexpectedly pivoting back to its locking position after the plunger is released, even if it is subjected to continuous slight vibrations during operation of the engine.

Figure 4:
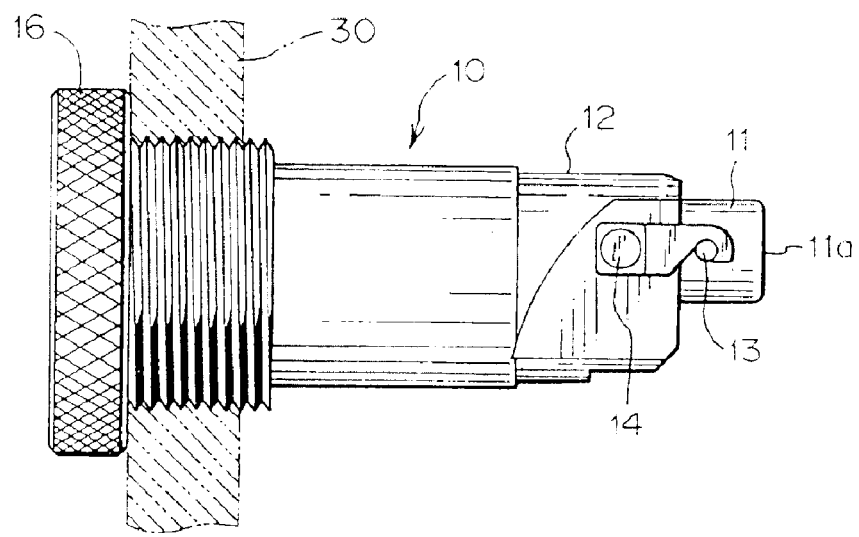
FIG. 4 is a side elevational view of a tensioner in accordance with a second embodiment of the invention.
Figure 5:
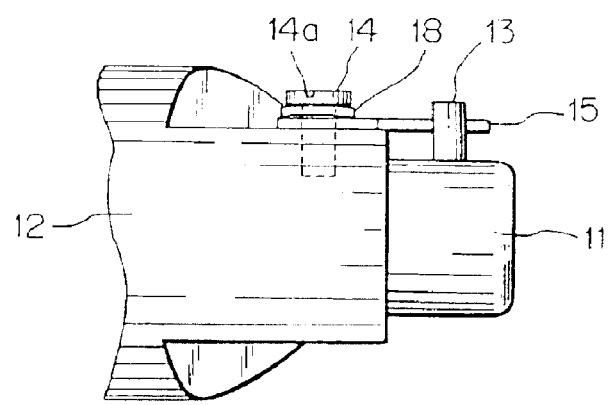
FIG. 5 is an enlarged view of a portion of the tensioner of FIG. 4.
Figure 6:
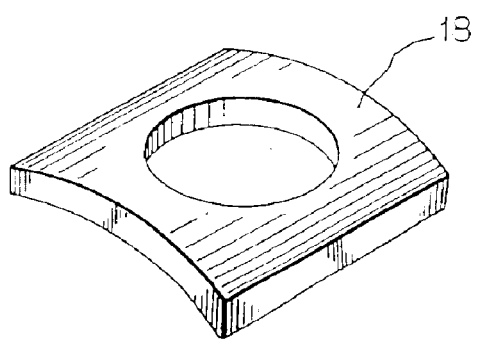
FIG. 6 is an enlarged perspective view of a plate-shaped spring used in the second embodiment.
Figure 7:
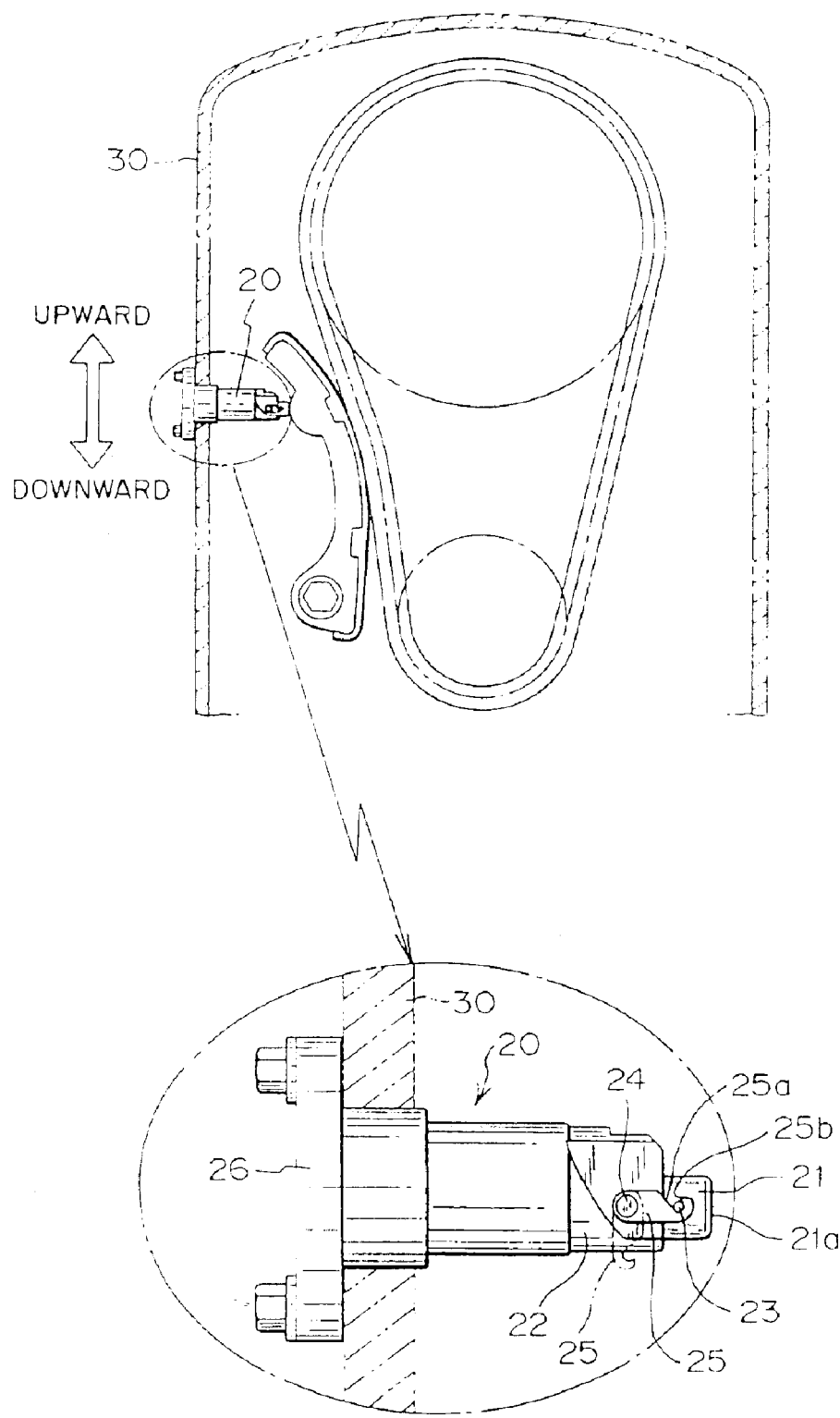
FIG. 7 is a schematic elevational view of a conventional tensioner having a projection-preventing hook, including an enlarged view of the tensioner.
Figure 8:
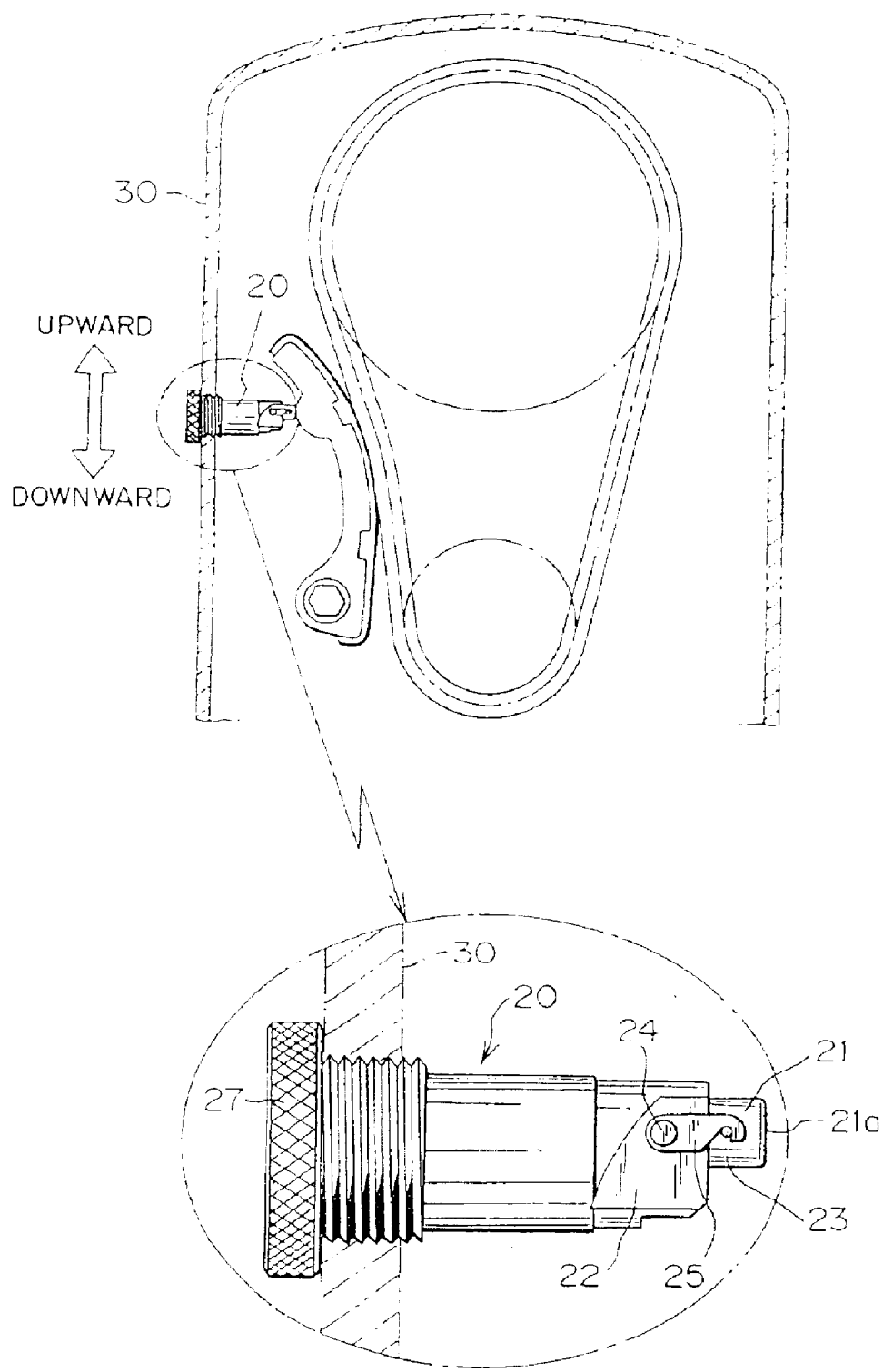
FIG. 8 is another schematic elevational view of a conventional tensioner having a projection-preventing hook, including an enlarged view of the tensioner.
Figure 9A:
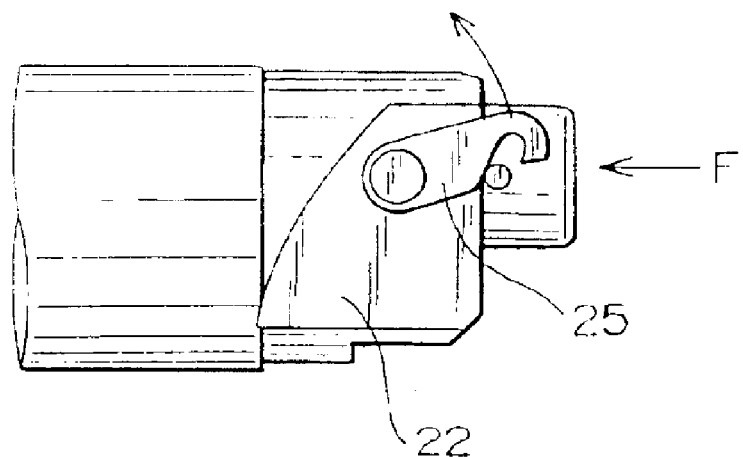
FIG. 9(a) is an enlarged view illustrating disengagement of the projection-preventing hook in a conventional tensioner.
Figure 9B:
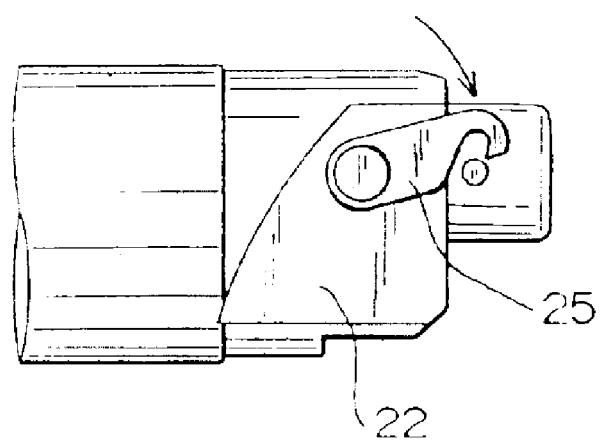
FIG. 9(b) is an enlarged view illustrating re-engagement of the projection-preventing hook in a conventional tensioner.

In the second embodiment of the tensioner in accordance with the invention, as shown in FIGS. 4–6, a plate-shaped spring 18 is used, instead of an O-shaped ring, as a resisting member. The structure of the tensioner is otherwise similar to that of the tensioner of FIGS. 1–3.

The plate-shaped spring 18 has an arched curvature as shown in FIG. 6, and is produced by boring the center portion of a metallic sheet of stainless steel or the like and bending the sheet in an arch. The plate-shaped spring 18 is superior, in heat resisting properties and weathering properties, to the O-shaped ring 17 composed of synthetic resin or the like, and is better suited for use in an engine block at a high temperature. The spring 18 may be disposed between the hook 15 and the dish-shaped head 14 of the fulcrum pin as shown, or alternatively between the hook 15 and the side wall of the tensioner housing 12.

In the tensioner of FIGS. 4–6, as in the tensioner of FIGS. 1–3, free pivoting of the projection-preventing hook 15 is prevented. Thus, when the lock pin 13 is released by rotation of the hook 15 as a result of an initial inward movement of plunger 11, return of the hook to the locking position is prevented by the friction between the hook 15 and the plate 18. Thus, the tensioner 10 can be mounted without regard to its rotational position, and a mounting structure consisting of threads and a flange can be used.

The plate 18 can prevent the projection-preventing hook 15 from unexpectedly pivoting back to its locking position after the plunger is released, even if it is subjected to continuous slight vibrations during operation of the engine.

Therefore, the lock pin 13 is reliably released, and its released condition can be maintained reliably for a long period of time. Thus, a high degree of reliability in the tensioner is achieved.

Although an O-shaped ring 17 and a plate-shaped spring 18 have been described for use as resisting members in the tensioner in accordance with the invention, other resisting members, such as spring washers and the like, can be used.

In the tensioner in accordance with the invention, even if the projection-preventing hook is urged by its own weight toward the latching position, and even if it is subjected to continuous slight vibrations during operation of the engine, it does not return unexpectedly to its plunger locking position. At the same time, the tensioner can suppress vibration noise which would otherwise be generated at the projection-preventing hook. Therefore, the tensioner may be mounted on an engine block without regard to its rotational position, and still function reliably. Mounting and demounting of the tensioner during assembly and maintenance of the engine are easy, and the greater freedom in the design of the of engine layout and the assembly process are afforded.

Where the resisting member is an O-shaped ring, free pivoting of the projection-preventing hook is suppressed, the locking pin is reliably released, and the released condition is reliably maintained for a long period of time. Therefore, the reliability of the tensioner is further enhanced.

Where the resisting member is a plate-shaped spring similar results are achieved, and pivoting of the projection-preventing hook is positively prevented even when it is subjected to continuous slight vibrations in the operation of the engine.

The tensioner can be mounted using a mounting structure consisting of threads and a flange. Thus, it is not necessary to predefine the rotational position of the tensioner. Thus, the mounting and demounting operations or the like of the tensioner during assembly and maintenance of the engine is easy. Moreover, the tensioner can be applied to various engines.

Obviously, various minor changes and modifications of the invention are possible in the light of the above teaching. It is therefore to be understood that within the scope of the appended claims, the invention may be practiced otherwise than as specifically described.

What is claimed is:

1. A tensioner for applying tension to a timing belt or timing chain in an engine, the tensioner comprising a tensioner housing having front and rear ends, a plunger extending outward from the interior of the housing at the front end thereof, and having a forward end outside the housing, the plunger being slidable into and out of the housing along an axis from a withdrawn position to an projected position, and being spring-urged in a projecting direction along said axis, a lock pin on the plunger adjacent the forward end of the plunger and extending laterally with respect to said axis, a fulcrum pin on a side wall of the tensioner, and a projection-preventing hook pivoted on said fulcrum pin, the fulcrum pin being positioned so that the hook can engage the lock pin when the plunger is in said withdrawn position, wherein the improvement comprises a resisting member, fitted onto the fulcrum pin, and exerting a frictional force on the hook to produce resistance to pivoting movement of the hook, whereby pivoting movement of the hook, and noise due to vibration of the hook, during operation of the engine are suppressed, in which the resisting member is a plate-shaped spring.

2. The tensioner according to claim 1, in which mounting threads are provided on a portion of the housing adjacent the rear end thereof.

* * * * *